United States Patent Office 2,968,926
Patented Jan. 24, 1961

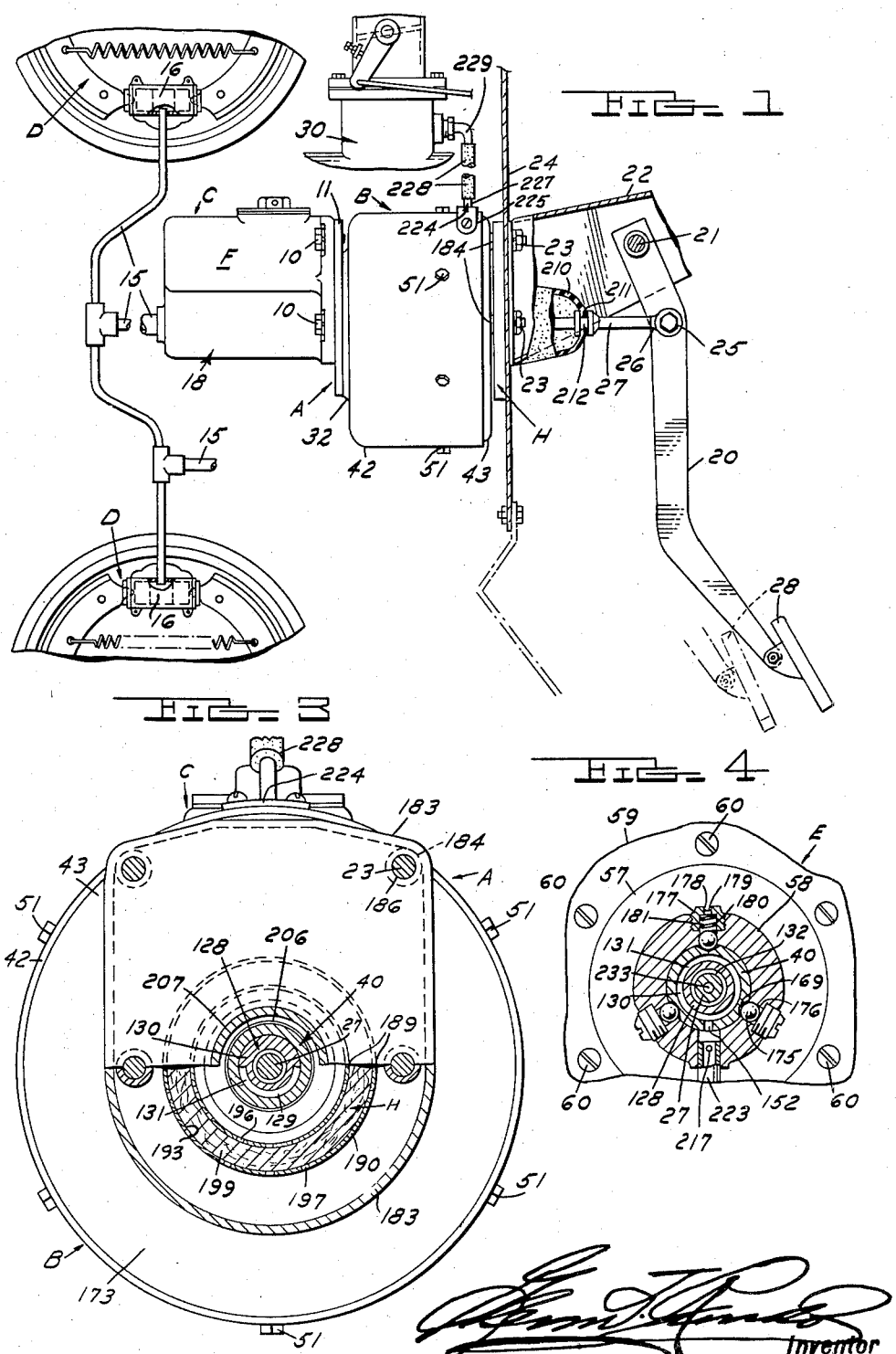

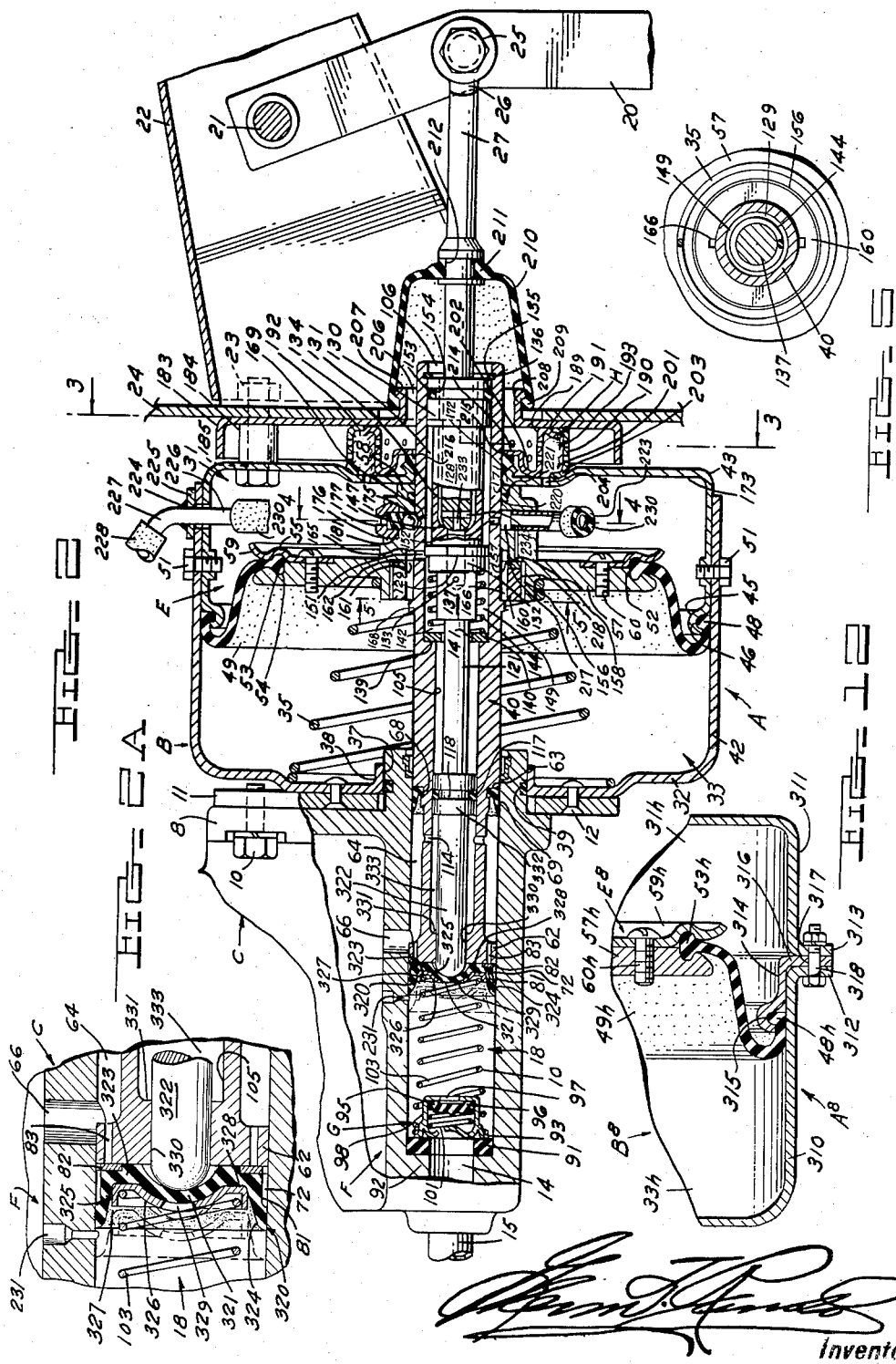

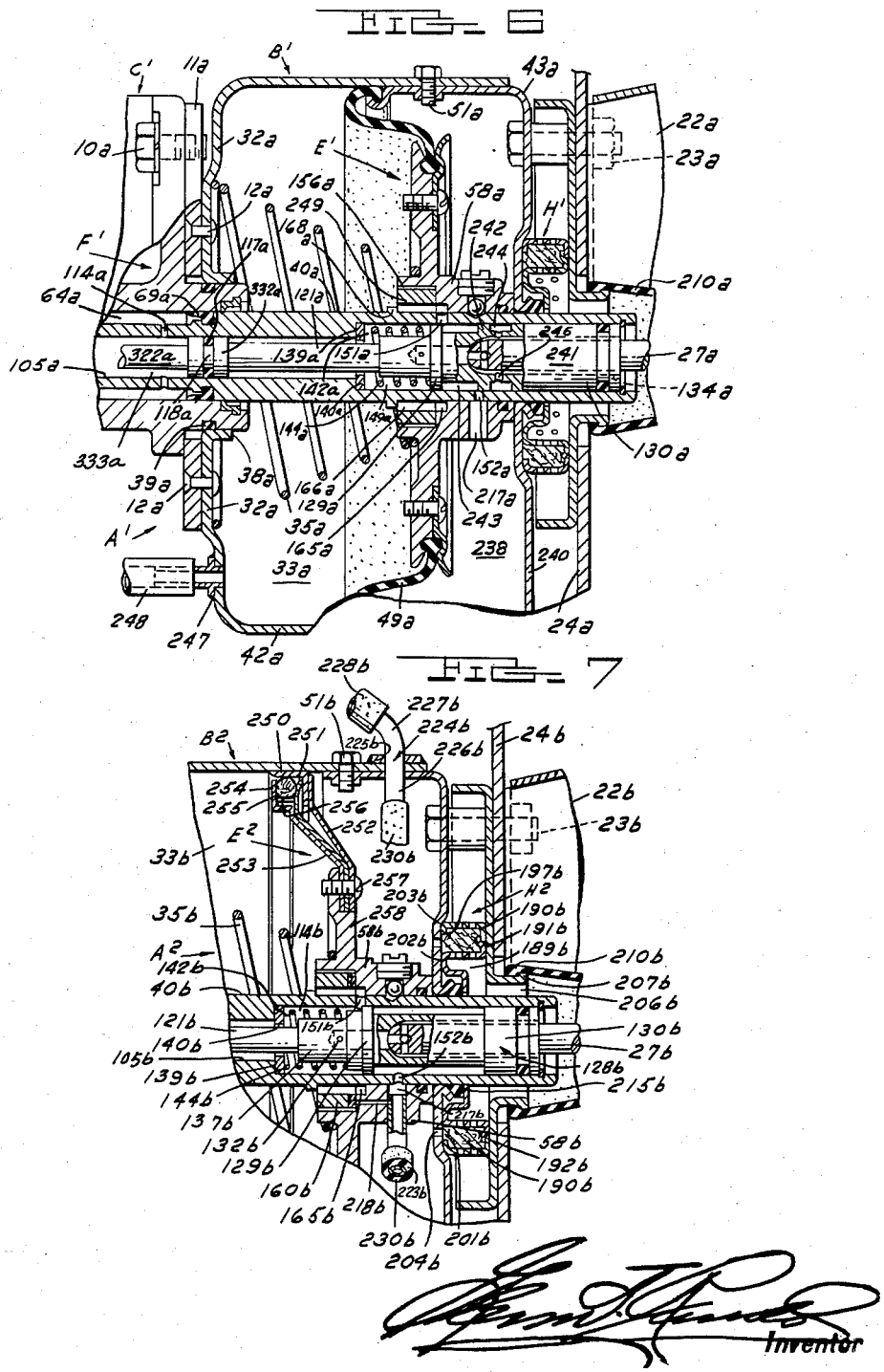

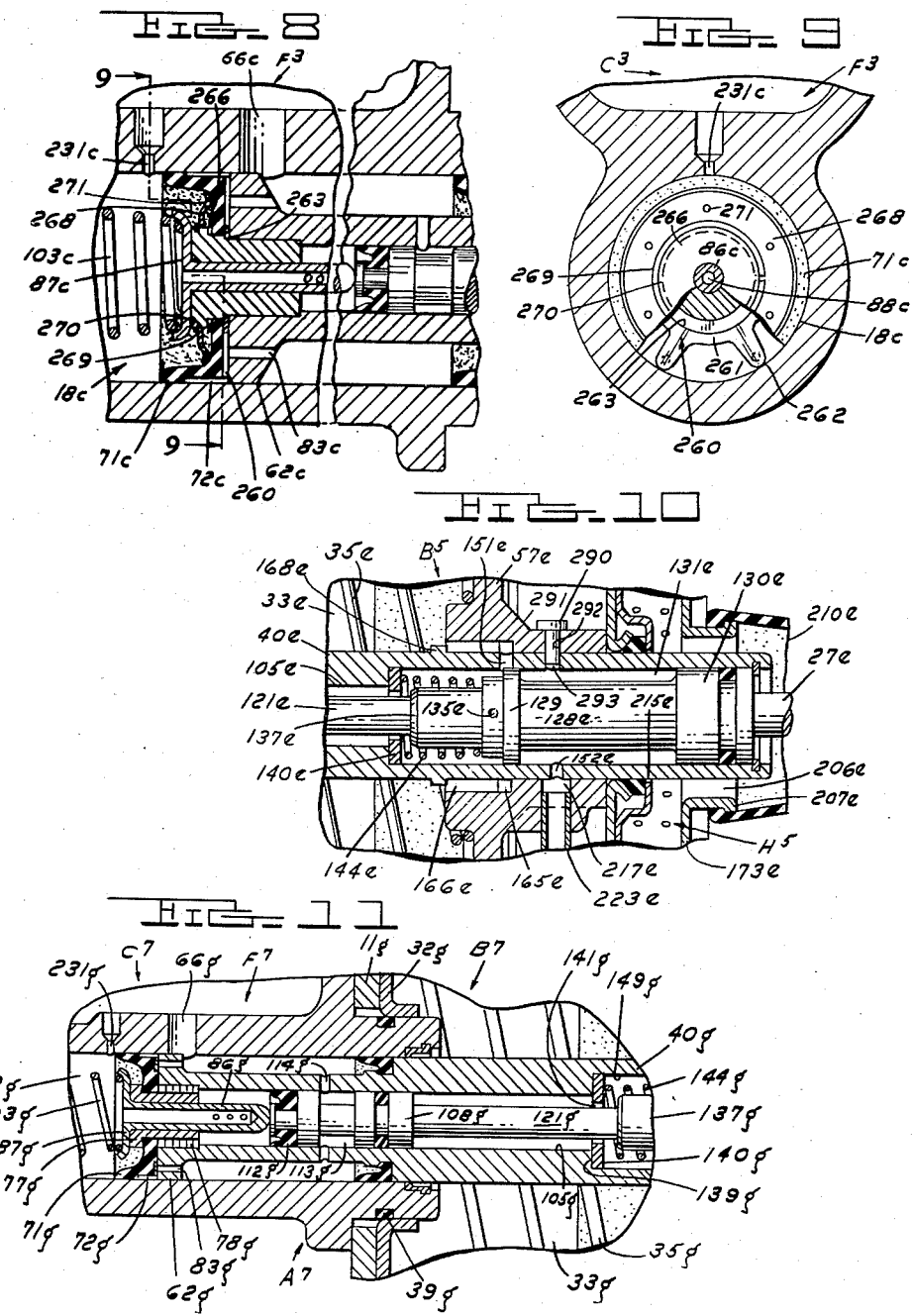

2,968,926

POWER-ASSISTED OPERATING MECHANISM FOR HYDRAULIC PRESSURE SYSTEMS

Glenn T. Randol, Mountain Lake Park, Md., assignor of fifty percent to Hamill-Markus Industries, Inc., Warren, Mich.

Original application Nov. 21, 1955, Ser. No. 547,994. Divided and this application Jan. 24, 1957, Ser. No. 636,193

12 Claims. (Cl. 60—54.6)

The present invention relates to power-assisted operating mechanism in which physical operating force applied to an operator-operated member is supplemented by power assistance, said mechanism including a liquid pressure producing device which is intended primarily as an actuator for hydraulic brake systems of automotive vehicles and the like, although other uses are obviously feasible. This application is a division of my copending application Serial No. 547,994, filed November 21, 1955.

The present invention has for a broad objective, the provision of a new and novel power control valve for controlling the pressure-responsive power assembly of a pressure-differential operated booster motor, said control valve having at least two principal relative displaceable spring-loaded elements with included spring-reaction progressively transmitted to an operator-operated member via one of the valve elements mechanically connected directly to said operator member, during power-boost; said spring-loaded valve elements being opposed by said spring-reaction supplemented by hydraulic reaction upon the fluid in the master cylinder becoming pressurized whereby relative displacement aforesaid of said valve elements is induced when operator force exerted on the one valve element exceeds the force-transmitting capacity of the normally preloaded status of said valve elements substantially counterbalanced by said opposing spring and hydraulic reaction on the fluid-displacing assembly in the master cylinder.

An object related to the object next above is the provision of new and novel interaction and cooperation between the fluid-displacing assembly of the conventional firewall mounted master cylinder and the said control valve whereby said booster motor attains its operative status to produce power-boost in response to said relative displacement of the valve elements accommodated by modulation of their normally spring-loaded status induced by reaction from the master cylinder return spring reacting on said fluid-displacing assembly subsequently supplemented by hydraulic reaction thereagainst when the brake fluid becomes initially pressurized in accordance with the thrust-transmitting capacity of the normal spring load on said valve elements under influence of said operator member.

Another object related to the two objects immediately preceding is to provide a booster brake assembly of the above character wherein conditioning of the brake master cylinder to pressurize the brake fluid is effected in response to initial movement of the operator member from a normally released position prior to relative displacement thereby of said control valve elements for power-activation of said booster motor.

The prior art discloses a pressure producing device comprising a substantially conventional master cylinder, a power cylinder, and two coaxial plunger or piston members adapted to concurrently displace liquid from the master cylinder, one of said members being operably projectable into the master cylinder by the power cylinder movable member, and the other of said members being operably projectable relatively to and simultaneously with the one member by the force exerted by the operator on a member such as a pedal.

The primary object of the present invention is to provide a device of this type which is appreciably improved from the standpoint of commercial acceptability over any similar device heretofore proposed. Such improvement providing the following advantages:

(a) Improved reaction on the operator pedal member to provide an unusually controllable power-boost to give the pedal a natural "live" feel with instinctive predictable braking reaction;

(b) A power unit which utilizes the conventional foot-operated master cylinder without sacrificing its well known and desirable features of liquid compensation to maintain the hydraulic system in brake-applying condition, the most simple and effective method of sealing the liquid within the pressure chamber from the power chamber of the power unit, and the especially important operating characteristic of enabling "feathering" of the brake-applying operation as by pumping the pedal to maintain brake shoe contact as expansion of the brake drum occurs on long downgrades, and to prevent overheating resulting from the necessity of sustained brake shoe contact as in prior art devices devoid of liquid compensation at all working positions of the pedal;

(c) A power unit in which the pressure-transmitting member actuated by the movable power member is directly operated by the pedal in the normal manner independently of the power member when power is "off" to provide a "straight-through" operation of the conventional master cylinder;

(d) A power unit combining hydraulic and spring reaction progressively increased as the pedal is moved from released position with such spring reaction removed from the power member during brake-applying and holding operations to provide maximum power-boost at all energized positions of the power member;

(e) A power-operated master cylinder which requires no "learning" period or change of driver habits, and literally improves the safety of car operation over that provided with foot-operated hydraulic braking systems;

(f) A power unit which incorporates control valving coaxially disposed wholly within the tubular pressure-transmitting member aforesaid to provide a most simple and durable power control arrangement; and (g) A power unit requiring a small diameter cylinder to facilitate installation in present-day motor cars in which space is at a premium especially for accessories incorporated in the engine compartment on after-market cars.

Stated in greater detail, the present invention provides novel power-operated means disposed between a hydraulic master cylinder of substantially conventional design and the associated driver-operated pedal, for controlling in part braking operations and transmitting to the driver via said pedal an awareness, or physical perception, of a portion of the total brake-applying hydraulic thrust engendered in response to incremental depressing and releasing movements of the pedal aforesaid for causing corresponding operations substantially of the power-operated means to assist in the actuation of the hydraulic master cylinder to apply and release the brakes, respectively, said hydraulic thrust reaction being supplemented by spring means characterized by increasing tension on the pedal progressively induced by operation of the pedal in a brake-applying direction from released position.

The assembly referred to in the preceding paragraph incorporates a novel arrangement of the parts whereby the piston of the hydraulic master cylinder is tubular and includes a coaxially disposed piston of less cross-sectional area operably connected to the pedal via a control element for controlling the operating power to energize the power-operated means, said latter piston providing proportional hydraulic thrust on the pedal to the degree of total braking force effective in the hydraulic lines. The master cylinder piston assembly being of composite arrangement comprising the two pistons aforesaid with the tubular piston acted on by the movable power assembly of the power-operated means, and the smaller coaxial piston is operably connected to the pedal via the control element for the power-operated means, said latter connection providing limited relative movement of the pedal, control element and piston of less cross-sectional area with respect to the tubular piston with both of said pistons operably projectable into the hydraulic pressure chamber. The movable power assembly is mounted on the tubular piston in encircling relationship with respect thereto and is optionally detachable from or fixed to said tubular piston enabling pedal operation of the tubular piston independently of or in unison with the movable power member in the event of power failure or inadequacy. In the latter instance increased physical effort on the pedal would be required due to the added resistance of the movable power assembly and its return spring acting in opposition to pedal operation thereof when the power is "off."

A further object importantly related to the object immediately preceding is the novel operative association of normally preloaded spring means between a conventional residual pressure check-valve and the pedal-actuated piston section for producing the aforesaid supplemental reaction characterized by increasing tension progressively induced by pedal operation in a brake-applying direction, said spring means including a movable seat continuously acting on the aforesaid piston section exposed to the hydraulic thrust within the master cylinder pressure chamber whereby the spring means react solely on the pedal via the coaxial piston and control element during power assistance, but release of the pedal is effective to cause the movable seat under influence of said spring means, to engage the tubular piston with resultant simultaneous movement of both pistons and control element aforesaid to their respective released positions wherein relative disposition of the coaxial piston and control element with respect to the tubular member is re-established.

A further salient feature of the present invention provides novel control valving for the power-operated device, coaxially disposed wholly within the tubular piston member for efficient and long service life.

Another important feature of my invention is the novel adaptation of the different power cylinder constructions herein disclosed and described to accommodate either air-suspended or vacuum-suspended normal status of the movable power member in released position.

Another object related to the object immediately preceding is the provision of optional novel power cylinder assemblies to accommodate either a solid type-piston or flexible diaphragm as the movable power member.

In a more specific sense, the present invention seeks to adapt novel power-operated mechanism in combination with the standard components comprising the conventional master cylinder of present-day hydraulic braking systems commonly employed on motor vehicles, said mechanism operating the master cylinder with reduced pedal effort, thereby enabling "pumping" or "feathering" control on long downgrades to prevent dangerous brake "fade" due to heat, and in the event of power failure or inadequacy, the master cylinder may be operated directly by the foot through the pedal in the usual manner and with the usual effort required as is understood.

With these and other objects and advantages in view, the invention consists of the new and novel combination, construction, and arrangement of parts as hereinafter more fully described, set forth in the claims appended hereto, and disclosed in the accompanying drawings forming part hereof, wherein:

Figure 1 is a schematic view of a side elevation of my improved liquid pressure producing mechanism constructed in accordance with the present invention, and shown exemplarily connected diagrammatically to operate a hydraulic brake system of an automotive vehicle or the like;

Figure 2 is an enlarged longitudnal sectional view, partly in side elevation, of the brake operating mechanism per se shown in Figure 1 wherein the brakes are in fully released condition;

Figure 2A is a fragmentary section of Figure 2 on an enlarged scale, showing the novel cup seal and spring seat assembly associated with the piston head of the master cylinder, for clarity of detail;

Figure 3 is a rear elevation partly in section taken along the line 3—3 of Figure 2 looking in the direction of the arrows, and showing details of the portion of the power assembly mounted on the vehicle firewall, and in which is housed the air cleaner;

Figure 4 is a transverse sectional view taken along the line 4—4 of Figure 2 looking in the direction of the arrows, and showing details of the releasable connection between the movable power member and primary tubular piston including the connection to the vacuum source and associated air-vacuum passageways in the coaxially disposed control valve element;

Figure 5 is a transverse sectional view taken along the line 5—5 of Figure 2 looking in the direction of the arrows and showing details of the annular collar press-fitted on the tubular pressure-transmitting piston and which carries the vacuum-air passageways communicating with the vacuum power chamber;

Figure 6 is a modified form of the invention in which the movable power assembly is normally vacuum-suspended in released position;

Figure 7 is another modified form of the invention in which the movable power assembly comprises a solid piston in lieu of the flexible power diaphragm;

Figure 8 is another modified form of the invention showing a different mounting of the annular ring-type cup seal on the head end of the tubular piston which includes a modified star-shaped reed valve to replace the ring valve of the Figure 1 embodiment;

Figure 9 is a transverse sectional view of the Figure 8 modification taken along the line 9—9 thereof;

Figure 10 is another modified form of the invention in which the releasable connection between the movable power member and tubular piston is eliminated by making the member rigid with the piston for movement in unison;

Figure 11 illustrates another modified form of the invention for controlling the by-pass or compensating port normally open between the master cylinder pressure chamber and reservoir and for sealing off the pressure chamber from the two hydraulic pistons projectable into said chamber; and Figure 12 illustrates another modified form of the invention for anchoring the peripheral marginal portion of the flexible power diaphragm in air-tight sealed relation with respect to the interior of a modified form of the power cylinder.

Referring now to the drawings, and particularly Figures 1, 2 and 2A, my improved hydraulic pressure producing device generally indicated at "A" comprises a power cylinder "B" and a hydraulic master cylinder "C" having an intergal end flange 8 for preferably mounting it on one end of the power cylinder as by cap bolts 10 threaded into a plate 11 secured as by rivets 12 to the cylinder end. The end of the hydraulic cylinder remote from the power cylinder has a discharge port 14 which is connected by one or more conduits 15 to one or more hydraulically actuated motors or wheel cylinders 16, which may be employed to operate automotive wheel brakes generally designated "D."

The interior of the hydraulic cylinder C is formed as a pressure working chamber 18, wherein the operating pressure for the wheel cylinders 16 is developed jointly by the force exerted by a power assembly generally indicated at "E" movable within the power cylinder B and the force exerted by the operator on a pedal 20. The upper end of the pedal, for example, is pivotally supported at 21 on a bracket 22 secured by bolts 23 between the firewall 24 and dash panel (not shown) in the operator's compartment of the vehicle. At a point below the pivot 21 the pedal is pivotally connected by means of a pin 25 to a clevis 26 formed on one end of a thrust or push rod 27 to provide, for example, a 5 to 1 leverage ratio between the thrust connection aforesaid and a foot pad 28 at the lower end of the pedal.

The power cylinder B is preferably a differential air pressure operated cylinder, utilizing either vacuum or compressed air to provide the necessary pressure differential across the movable power assembly aforesaid. In ordinary automotive installations, a vacuum-operated power cylinder is preferable to a compressed air operated power cylinder, since the conventional engine intake-manifold, such as shown fragmentarily at 30 in Figure 1, may serve as the vacuum source without affecting engine performance.

The vacuum power cylinder in the preferred illustrated embodiment of the invention (Figure 1) is atmosphere-suspended; i.e., air at atmospheric pressure is normally on both sides of the movable power assembly E which may take the form of a flexible diaphragm or rigid piston, when the mechanism is in released position best demonstrated in Figures 2 and 2A. Although a vacuum-suspended power cylinder herein illustrated as a modified form of the invention may be used if desired, there are certain advantages accruing from the use of an atmosphere-suspended power cylinder as, for example, chamber 31 of the power cylinder does not have to be sealed, since it is maintained under atmospheric pressure. That is to say, the angular movement of control rod 27 during the pressure stroke does not create any structural problem in the design of the power cylinder. Moreover, operation of an atmosphere-suspended power member is inherently smoother and less sensitive than the operation of a vacuum-suspended power member. On the other hand, speed of operation, which is the primary advantage of the vacuum-suspended arrangement, is not considered vital in installations where my improved pressure producing device would most likely be used as against installations in heavy-duty installations. Actually a slowed more controlled build-up of power force during initial stages of vehicular brake application is conducive to preventing sudden stops particularly those stops during low vehicular speeds as when cruising in congested traffic-light controlled intersections, etc.

The movable power assembly E, which is referred to in certain of the claims as a pressure-responsive movable wall or member, forms with the inside of the end wall 32 on which the hydraulic cylinder C is mounted, a control or vacuum power chamber 33 within the power cylinder B. A normally preloaded helically formed return spring 35, usually in practice of conical configuration, is operably disposed in the power chamber between the inside of the end wall 32 and confronting side of the movable power assembly E for biasing the latter toward released position.

A central annular opening 37 formed with an inturned flange 38 is provided in the end wall aforesaid, into which an annular hub portion of the master cylinder projects in air-tight sealing relationship as by the illustrated pliant O-ring seal 39 carried in the annular channel formerly utilized for anchoring the forward end of a dust excluding member such as a flexible boot, to prevent escape of vacuum from the power chamber 33. An axially bored pressure-transmitting or working member designated as a whole 40 operably projects through said hub portion in coaxial relation thereto, said member will be referred to in certain of the claims as a hydraulic piston or plunger, or a primary piston or plunger for flexibility in terminology, and is adapted to operably project in fluid-tight sealed relation into the working or pressure producing chamber 18 of the hydraulic cylinder. The power cylinder B is formed of two cylindrical cup-shaped members 42 and 43 having their cylindrical wall portions of their open ends telescoped. A marginal edge portion 45 of the inner member 43 is formed with an external annular channel 46 adapted to receive an annular bead 48 on a flexible diaphragm 49 preferably made of molded rubber, said channel being effective in assembled relationship with respect to the inner cylindrical surface of the outer member 42 to slightly deform the bead under compression and thus secure the peripheral edge of the diaphragm in air-tight operating condition within the power cylinder.

A plurality of cap bolts 51 are threaded from the exterior through the overlapping cylindrical walls of the two members 42 and 43 rearwardly adjacent the channel 46 to secure the two members rigidly assembled as shown in Figure 2. The diaphragm 49 has a central opening 52 with its edge portion formed with a double annular bead 53 which is clamped between confronting annular channels 54 and 55 formed respectively in an annular end flange 57 integral with a sleeve 58 and a detachable clamping plate 59 secured to the flange 57 as by cap bolts 60, the diaphragm, flange, sleeve, and clamping plate to thus form in assembled relation the movable power assembly E.

The portion of the axially bored working member 40 projecting into the working chamber 18 comprises a spool-type assembly having an annular head land 62, an annular shoulder 63 longitudinally spaced from the head land to provide an annular liquid space 64 therebetween and which is adapted to have uninterrupted communication via an intake port 66 leading to a liquid reservoir "F" associated with the hydraulic master cylinder C. Adjacent the shoulder 63 is an annular groove or channel 68 for reception of an annular single lip seal 69 preferably made of flexible rubber. The end face of the head land 62 is equipped with an annular pliant cup seal 320 having a plurality of circumferentially spaced flutes 72 in the outer surface of its periphery. The central portion of the cup is formed with a forwardly extending hollow dome-shaped embossment 321 which is coaxially disposed with respect to a reactive piston or plunger 322 having a complemental dome-shaped end projecting forwardly of the face of the head land 62 in coaxial disposition with respect to said spool-type assembly into contact with the inner surface of the embossment, said reactive piston being also termed a "secondary" piston or plunger for flexibility in terminology. A vertical web or wall 323 interconnects the embossment with a peripheral lip portion 324 of the seal and is adaptel to engage the end face of the piston head 62 with the peripheral heel portion of the lip indented as at 81 to receive a washer-type valve ring 82 bonded to the cup to control a plurality of liquid passageways 83 which accommodate flow of liquid via flutes 72 between the annular space 64 and working chamber 18. A movable spring seat 325 having a central dome-shaped extrusion to seat against the exterior of the cup embossment 321, is formed with inner and outer legs or flanges 326 and 327, respectively, which are interconnected by a vertical web portion 328 with a central opening 329 provided in the flange 326, the web portion normally bearing against or closely adjacent to the cup wall 323 under influence of a reactive and return spring operably disposed in the working chamber 18 which will be fully described hereinafter, thus providing means for maintaining the cup seal in substantially juxtaposed relation with respect to the head land 62 during the working stroke thereof to displace liquid under pressure through the discharge port 14 and to assist in the return of the primary piston 40 to released position, said spring also serving the important function of continuous reaction on the dome-end of the coaxial piston 322 via the spring seat and cup dome portions to provide supplemental reactive force on the pedal 20 according to the operating stroke of both pistons 40, 322 whereby said spring reacts only on the pedal via said plunger 322 during brake-applying operations and on both of said pistons during brake-releasing operations to establish them in their respective released positions. A removable valve seat 91 encircles the discharge port 14 and is adapted to engage the end wall 92 of the pressure working chamber 18. A residual pressure check-valve assembly "G" having an outturned annular flange 93 movably engages the seat 91, said check-valve assembly having a self-contained pressure discharge one-way check-valve 95 for enabling liquid under pressure to be displaced through the discharge port 14, and which cooperates with a seat 96 encircling an opening 97 through the end wall of the check-valve "G" casing 98 under the influence of a normally preloaded compression spring 101.

The previously mentioned reactive and return compression spring designated by the reference numeral 103 is preferably of conical configuration and operably disposed in the working chamber 18 between the spring seat 325 and flange 93 whereby its biasing action controls seating of the check-valve assembly G and continuously reacts on the spring seat 325 and secondary piston 322, thus spring 103 may be termed a "valve control" and "reactive" spring for novel purposes which will be more fully appreciated in the course of the description to follow. With further reference to the spring 103 it is desired to point out that this spring is characterized by increasing tension above a pre-energized status, progressively induced by operating the pedal 20 from released position, and since its other function is to control the residual pressure check-valve G, the preloaded normally installed status of this spring cannot exceed the tension required to maintain substantially 5–10 p.s.i. in the hydraulic lines external to the discharge port 14 in accordance with factory specification. However, if this spring is not employed to control the residual pressure check-valve, as would be the case where a self-contained residual check-valve is used, then the preloaded tension of this spring may be selectively set to whatever initial reaction on the pedal is desired as its reaction in no way opposes a brake-applying movement of the power assembly E. Therefore, no power loss can result from the power member E having to overcome not only the reaction from its own return spring 35 but also the added reaction from spring 103.

The tubular working member 40 also includes an axial bore 105 coaxially merging with a counterbore 106 of larger diameter leading to the outer terminus of the tubular member, and a reduced diameter bore 330 substantially in circular alignment with the head land 62 and through which the dome-end of the reactive plunger 322 projects into contact with the embossment on the cup 320. This reduced diameter bore forms an internal annular shoulder 331 with the bore 105, the latter bore being longitudinally spaced forwardly from an annular land 332 formed on the plunger 322 to provide an annular liquid space 333 therebetween, said land having a working fit with respect to the bore 105 and carries a ring-type pliant seal 117 in an annular channel 118 formed medially therein. A port 114 through the wall separating the annular spaces 64 and 333 maintains liquid communication between these spaces. Accordingly, the aforesaid seals cooperate to confine all static liquid within the reservoir F and the two annular spaces aforesaid.

A slide valve element 128 is disposed in the counterbore 106 of the tubular member 40 for controlling operation of the power assembly E. This valve is the spool-type and comprises two longitudinally spaced annular lands 129 and 130 forming an annular vacuum space 131 therebetween, a closed end axial bore 132 which is intersected by cross bore 133 through the wall of the valve, and a counterbore 134 merging with the bore 132 and extending to the outer terminus of the valve element. A split retainer ring 135 engages an annular groove 136 in the inner surface of the counterbore 106 adjacent the outer terminus of the tubular member 40 to establish the valve element 128 and associated parts in their normal released positions best shown in Figure 2. A reduced extension 137 terminates the inner end of the valve element 128 through which the cross bores 133 are made, and is adapted to normally engage the confronting end of the reactive plunger stem 121 whereby the compression spring 103 is normally effective to bias the reactive plunger 322 and valve element 128 to their respective released positions as shown in Figure 2. An internal annular shoulder 139 is formed at the point of mergence between the longitudinal bore 105 and counterbore 106, said shoulder being engaged by a thrust washer 140 having a central opening 141 through which the inner end of the stem 121 operably projects into engagement with the confronting end of the reduced extension 137. A predetermined lost-motion space 142 is defined between the washer 140 and confronting end of the reduced extension 137 for limiting relative movement of the reactive piston 322 and slide valve 128 with respect to the tubular member 40, and a normally preloaded thrust-transmitting compression spring 144 is operably disposed between the washer and a shoulder 145 formed by the mergence of the reduced extension 137 with the inner annular land 129 on the slide valve 128 to return the latter to its normally released closed position shown in Figure 2 in cooperation with the spring 103.

The merging point of the counterbore 134 with the axial bore 132 of the slide valve element 128 provides an internal annular shoulder 147 against which the free end of the push rod 27 acts to enable operator force applied on the pedal 20 to actuate the slide valve element and reactive plunger in opposition to the biasing force of the two springs 103 and 144 and the proportional liquid pressure condition within the working chamber 18 whereby the operator is given a reduced "feel" of the degree of total brake applying force effective at the wheel cylinders 16.

An atmospheric chamber 149 is formed in the interior of the tubular member 40 between the washer 140 and inner annular land 129 and which is connected to atmosphere via the cross bores 133, axial bore 132 and counterbore 134. A port 151 is provided in the tubular member 40 normally communicating with the atmospheric chamber 31 when the slide valve 128 is released as shown in Figure 2. This latter port is controllable by the annular valve land 129 to selectively connect the port to vacuum and atmosphere. Another port 152 passes through the wall of the tubular member 40 for communicating at all times with the annular space 131, and an annular O-ring seal 153 is provided in an annular channel 154 in the outer valve land 130 to insure against loss of vacuum past this valve land.

The flange sleeves 57, 58 are formed with an internal annular recessed portion 156 and a reduced annular recess 157 respectively providing an annular shoulder 158 therebetween. A thrust-receiving collar 160 is press-fitted on the outer diameter of the tubular member 40 normally in circular alignment with the recess 156. This collar has a reduced annular shouldered extension 161 on which is press-fitted an annular valve seat 162 preferably composed of hard rubber or suitable plastic material. The inner face of this valve ring is adapted to normally engage a complemental confronting circular face on the shoulder 158 thereby converting the reduced recess 157 into an annular channel 165 encircling the tubular member 40 in air-tight sealed relationship. A pair of longitudinal passageways 166 in the collar connects the power chamber 33 and channel 165. This channel is in circular alignment with port 151 at all times, and an external flange 168 is provided on the tubular member 40 to establish the circular alignment between the channel 165 and port 151, and also to insure that the collar 160 cannot be axially displaced from its operating position on the tubular member should the press-fit connection become inadequate. A plurality of circumferentially spaced recesses 169 are provided in the exterior surface of the tubular member 40 substantially in medially circular alignment with the sleeve portion 58 through which the outer end of the tubular member slidably projects through a bearing support opening 171 with an angular outturned marginal edge 172 from the central portion of the end wall 173 of the inner cup-shaped member 43 of the power cylinder. A plurality of movable detent elements 175, preferably balls, are disposed in a corresponding number of radial threaded bores 176 through the wall of the sleeve 58 in registry with the aforesaid recesses. A threaded plug 177 provided with a cross slot 178, a central venting bore 179 and a counterbore 180, is adapted to screw into the outer ends of each of said bores 176 to close the same, and a normally preloaded compression spring 181 is disposed in each of said counterbores in engagement with each of the detent elements aforesaid to bias said elements inwardly into engagement with their cooperating recesses. As clearly depicted in Figure 2, the curved surfaces of the detent elements are adapted to engage a portion of the side walls of the recesses 169 to induce opposed tension between the sleeve 58 and tubular member 40 to effect sealing between the annular valve seat 162 and fixed valve seat 158 to insure against leakby between the annular channel 165 and power chamber 33. From the foregoing it is apparent that atmospheric communication to the power chamber 33 in normal released status portrayed in Figure 2 is established in part via longitudinal passageways 166, annular channel 165, port 151, cross bore 133, axial bore 132, and counterbore 134.

An air filter assembly generally designated "H" is provided between end wall 173 of the inner power cylinder member 43 and a substantially rectangular mounting member 183 preferably formed as a sheet metal dish-shaped stamping with the edge thereof held in spaced relation to the end wall 173 by spacer sleeves 184 encircling mounting bolts 23 best demonstrated in Figures 2 and 3. These mounting bolts, usually four in number, are anchored in suitable openings 185 in the end wall of the member 43 and project through corresponding openings 186 in the stamping 183 and thence through similar openings in the vehicle firewall 24 and bracket 22, which when secured together by the bolts 23 serve to mount my liquid pressure producing device A in operating position on a motor vehicle best shown in Figure 1. The air filter assembly H comprises inner and outer metallic shells 189 and 190 of circular configuration with their vertical walls 191 and 192 respectively secured together as by welding to provide an annular space 193 between said circular walls. The inner and outer circular walls are perforated as at 196 and 197 respectively, and the annular space is filled with screening material 199 such as metallic wool. A circular opening 201 is provided between vertical walls 202 and 203, which communicates with holes 204 in circular alignment therewith through the end wall 173 of the member 43 thus placing the atmospheric chamber 31 in communication with the air cleaner perforations which in turn are in constant communication with an annular space 206 obtaining between an outturned centrally disposed spaced flange 207 and the tubular member 40, said flange 207 being provided with an external channel 208 to receive an internal annular bead 209 on a dust excluding flexible boot 210, the outer end of said boot having a reduced annular bead 211 engaging an external groove 212 in the push rod 27 whereby movement of the push rod is accommodated by the boot when the pedal 20 is operated. The slide valve counterbore 134 being in constant communication with the annular space 206 thus also utilizes the air filter assembly H to prevent foreign agencies from entering the power chamber 33 via the slide valve 128 and consequent possible impairment to the valve operation. An offset vertically disposed flanged portion 214 projects inwardly from the vertical wall portion 191 of the inner air filter shell 189 and has an annular opening 215 therethrough encircling the tubular member 40 in spaced relation thereto. An annular pliant seal 216 is disposed between the angular lip of the outturned flange 172 on the member 40 whereby in assembly, the inner marginal face thereof adjacent the opening therethrough is adapted to place tension on the sealing ring to slightly deform the same and thus insure a sliding air-tight fit of the tubular member 40 in its bearing support 171.

The sleeve and flange 57, 58 additionally have a longitudinal passageway 218 connecting the valve 162 with a port 217 which in turn communicates with the port 152 in the tubular member 40, said passageway 218 being closed by the collar 160 when engaged with the shoulder 158 and open when the tubular member 40 is moved relatively to the power assembly E, the latter operation being effective when operator force alone is utilized to operate the tubular member 40 when the power cylinder B cannot be energized due to fortuitous stoppage of the engine or, as would be the case in stopping the vehicle after coasting the same before starting the engine.

The sleeve portion 58 also carries an O-ring seal 220 in a corresponding internal groove 221 adjacent the terminus of the sleeve opposite the flange 57, and which encircles the tubular member 40 to prevent vacuum loss therebetween.

The port 217 is equipped with a rigid tubular fitting 223, and another rigid tubular fitting 224 having a medially attached mounting flange 225 is secured to the exterior of the cylindrical wall of the inner power cylinder member 43, with one end 226 of the fitting 224 extending into the atmospheric chamber 31 and the other end 227 projecting from the exterior of the cylinder. A flexible conduit 228 serves to connect a rigid tubular fitting 229 on the intake-manifold 30 to the outer end 227 of the fitting 224. Another section of flexible conduit 230 forming substantially a convolution is positioned within the atmospheric chamber 31 in encircling relation to the sleeve 58 and serves to connect the fitting 223 with the inner end 226 of the fitting 224 whereby the port 152 is connected to the source of vacuum enabling energization of the power chamber via passageway 218 when the tubular member 40 is separated from the movable power assembly E or via the slide valve 128 when the plunger member 40 and assembly E are normally connected together as shown in Figure 2 for conjoint movement responsive to relative sliding movements of the slide valve 128 induced by operation of the pedal 20 as is understood.

A restricted relief passageway shown at 231 between the liquid reservoir and pressure working chamber which is standard in all conventional hydraulic master cylinders of the type illustrated herein, is maintained closed throughout the full operating stroke of the tubular member 40 in a brake-applying direction and opened upon full release of the pedal 20 thus retaining the function of this passageway so that in field installations of my novel pressure-producing device A, the master cylinder installed at the factory can be used. In this way a lower cost unit to the public is provided over competitive power-brakes which require specially designed master cylinders sold with the power unit as a unitary assembly at an increase in price to the car owner and with no salvage value in the discarded master cylinder removed from the car. However, the present invention contemplates unitary assemblies of the power and master cylinders for either factory or field installation. This passageway is effective to compensate for excessive liquid in the hydraulic system upon full release of the brakes so that such excess can be returned to the reservoir F as is well understood in the brake art.

The free end of the valve push rod 27 has an axial passageway 233 and a cross passageway 234 intersecting the passageway 233 to accommodate free passage of air from the counterbore 134 to the valve axial bore 132. This arrangement is by way of example only, since the shoulder 147 formed by the mergence of the bores 132, 134 may be engaged by the free end of the push rod in such manner as not to obstruct free passage of air through said bores to the power chamber 33 when the brakes are being released. In this connection it is desired to point out that were the passageways 233, 234 removed from the end of the push rod 27, the brakes may be released since the pedal 20 moves faster than the withdrawal of the power member 40. This action would cause the free end of the push rod to become disengaged from the shoulder 147 at the inner end of the counterbore 134 thus enabling air to freely pass by the end of the push rod into the valve bore 132 and thence into the power chamber 33 via cross bores 133 and port 151 so that the power member E will retract toward released position shown in Figure 2. Accordingly, with the spherical end of the push rod devoid of the passageways 233, 234, when engaged with the shoulder 147 to actuate the slide valve 128 acts as a "valve" to close the outer end of the "valve" bore 132 thus supplementing the valve land 129 to prevent air from entering the power chamber 33 via the port 151, but when the pedal 20 is released to take the brakes "off" the end of the push rod becomes slightly spaced or disengaged from the shoulder 147 to enable air to enter the valve bore 132 whereby the power member E can return to its released position under influence of springs 103, 35 according to pedal movement. In practice, with the device A in fully released position, portrayed in Figure 2, the actuating end of the push rod 27 is slightly spaced from the shoulder 147 to insure complete release of the brakes.

Therefore, the present invention contemplates push rod construction having its valve actuating end with passageways 233, 234, or devoid of these passageways whereby the end of the push rod is so formed as to cooperate with a complemental surface on the shoulder 147 for venting bore 132 to atmosphere via counterbore 134 when the rod end disengages from said shoulder.

*Operation*

The manner in which my improved pressure-producing device A operates is believed manifest from the foregoing description. However, in the interest of clarity a more detailed consideration will be given to the operational stages of my device as follows:

Assuming that the device A is installed on a motor vehicle as the present disclosure exemplarily demonstrates in Figure 1, to operate the hydraulic brake system commonly employed on such vehicles and the device A is in released "brake off" condition as depicted in Figures 1, 2 and 2A. With the engine running, reduced pressure (vacuum) is produced within the intake-manifold 30 which is conveyed through conduits 228 and 230 via ports 217 and 152 to the vacuum space 131 thus substantially evacuating the air therefrom. The device is now conditioned for power operation by depressing the pedal 20 which initially moves the valve element 128 and reactive piston 322 in unison with the tubular member 40 against the bias of spring 103, the tubular member 40 and power assembly E being urged toward their respective released positions by springs 103 and 35. The operator is apprised of the degree of braking pressure being developed before and after the power phase becomes effective by the combined reactive forces produced by the effects of the two springs 103, 144 and the hydraulic pressure acting on the end of the reactive piston 322. Initial movement of the pedal 20 moves the reactive piston 322 with the valve element 128 and tubular member 40 relatively to the power piston E accommodated by release of the spring-pressed detent elements 175, to close the compensating port 231 and thus conditions the pressure working chamber 18 to displace liquid under pressure via check-valve 95 through the discharge port 14 into the wheel cylinders 16 to apply the brakes as is understood. At the same time the movable power member E is maintained in its released position as shown in Figure 2 due to the aforesaid release of the tubular member therefrom responsive to initial depression of the pedal 20. Increase of pressure on the pedal 20 projects both pistons 40, 322 further into the working chamber 18 causing a build up of pressure therein which is transmitted to the wheel cylinder 16 via the discharge port 14 to bring the brake shoes into substantial frictional contact with their respective drums wherein all slack is taken up in the system, such increase of pressure build up at this point acting to arrest further movement of the tubular member by the pedal and thus overcomes the preenergized status of the thrust-transmitting spring 144 enabling relative movement of the control valve 128 and reactive plunger 322 with respect to the tubular member 40 to cause the valve land 129 on the valve element 128 to close the port 151 in constant communication with the power chamber 33 via annular channel 157 and passageways 166 and reaching the relative disposition with respect to the port 151 in readiness to "crack" this port as demonstrated by the dashed line disposition of the parts in Figures 2 and 2A, whereby vacuum enters the power chamber 33 and thus evacuates the same of air as is understood. This action sets up a differential pressure condition across opposite sides of the movable power member E causing it to move leftward substantially proportional to the extent of movement of the pedal 20 into operative thrust-applying engagement with the collar 160 to provide power assistance in a brake-applying direction.

The resilient characteristic of the cup seal 320 enables the reactive plunger 322 to move relatively to the primary piston 40, and in so doing slightly elongates the embossment, while the elasticity of the cup seal embossment combined with the reaction of spring 103 via spring seat 325 tend to push the reactive piston 322 in opposition to pedal movement thereof. This latter action plus spring 144 provide the operator with an awareness of the effective braking force supplementally to the pressure acting across the end of the embossment of the cup seal engaging the dome-head of the reactive piston 322. The pliancy of the cup embossment 321 enables the spring 103 to react sufficiently close to the web 323 of the cup to maintain it and the lip portion in proper sealing relation with respect to the cylindrical surface of the working chamber 18 throughout the full working stroke of the head land 62. During the pressure working movement of the piston 40, the pressure condition within the working chamber supplements the action of spring 103 to stabilize the cup seal against the head of the piston 40 in effective sealing relationship with respect thereto as clearly depicted in Figures 2 and 2A.

It is important to further observe that the magnitude of the reduced hydraulic reaction on the pedal 20 exerted by the pressurized brake fluid on the end of the reactive piston 322 can be varied in accordance with the diameter of such element. However, this reduced reactive force will always be proportional to the force with which the brake shoes are frictionally applied to the vehicle brake drums, to provide the operator with accurate sensing of the amount of braking force being applied. This hydraulic reaction principle is in sharp contrast to the control characteristic provided by the spring 103 against which the control valve piston 128 is adjusted to control operative energization of the vacuum-motor B since resistance to depression of the pedal 20 increases in direct proportion to the distance it is depressed rather than pressure conditions to which the piston 322 is subjected. Therefore, such spring resistance alone would not necessarily have a magnitude correlated with the amount of braking force in effect for every position of the brake-pedal, and due to the use of this spring to control the residual pressure valve G its maximum preloaded status cannot exceed 10–12# to establish the required residual line pressure, its magnitude would not be sufficient to provide the necessary reaction. As spring 103 is additionally compressed above its normally preloaded status shown in Figure 2, to the position demonstrated by dashed lines in this figure, it provides increasing resistance to pedal movement up to the point of the brake fluid becoming initially pressurized under influence of operator effort exerted directly on the piston 322 and indirectly on the primary piston 40 via the spring 144 according to the latter's thrust-transmitting capacity in substantially its preloaded status depicted in Figure 2. Thereafter, resistance becomes substantially constant as a consequence of the substantially stationary condition assumed by the fluid-displacing parts (pistons 40, 322) resulting from the non-compressible column of brake fluid.

Accordingly, the reactive forces from the spring 103 and piston 322 are teamed together with the piston supplying the major portion of these combined diminutive reactions as a measure of the amount of braking force in effect at any given position of the pedal 20 at which the fluid is pressurized along its full operating stroke while the reactive force from the spring becomes substantially constant at the point the fluid reaches such a pressurized state. Spring 103 also combines with the vacuum-motor diaphragm return spring 35 to return the control valve parts and power diaphragm E to their respective normally released positions shown in Figure 2, yet spring 103 does not interfere with movement of the power diaphragm E in a pressure-producing direction since this spring is operated ahead out of engagement with the head land 62 in response to operator effort applied to the pedal 20 while the motor B is energized.

Since reaction from spring 103 is effective to a limited extent defined by the control of the residual pressure valve G and the distance the pedal 20 is moved to a point at which the brake fluid becomes pressurized under influence of the vacuum-motor B, it serves to best advantage as a reaction means by utilizing its yielding resistance through substantially the first-half of the series of potential pressurizing movements along the full operating stroke of the primary piston 40 which may be had by keeping the brakes properly adjusted and the system free of leaks which service operations contribute to safer driving. At pressurizing points beyond the halfway mark aforesaid of the piston 40, reaction from spring 103 would not sufficiently resist pedal movement to prevent power-surge from the motor B resulting from fast idle travel of the pedal in taking up such abnormal slack in the system before the motor could be energized to provide power assistance.

The foregoing operation completes what may be termed the "applied stage." With the brakes in applied condition, if the operator force on the pedal 20 is halted the movable power member E will slightly advance in the brake-applying direction to produce what may be termed the "poised stage" at any applied position of the primary piston 40. This latter operated stage is brought about by a "lapped" condition of the annular land 129 with respect to the port 151 induced by aforesaid slight relative movement of the primary piston 40 with respect to the slide valve 128 in the event brake pedal movement is halted as substantially exemplified in Figure 2 showing the relative position of the valve land 129 in dashed lines ready to "crack" the port 151. Thus the brakes may be held "on" with minimum operator effort on the pedal as a result of substantial counterbalance between the differential pressures aforesaid acting on the power member E and the existent hydraulic pressure in the hydraulic lines. If the power cylinder should fail to be effective or inadequate, the force exerted by the operator on the pedal 20 will bring the inner end of the valve extension 137 into engagement with the thrust washer 140, enabling the operator to operate the device A with physical force alone, if necessary, to attain the required displacement of liquid into the hydraulic system. With the power phase effective, however, incremental depressing and releasing movements of the brake pedal 20 cause corresponding follow-up movements substantially of the movable power member E to apply and release the vehicle brakes in a manner replete in the brake art.

During the applying stroke of the primary piston 40, the reactive piston 322 is held forwardly relatively to the tubular member which disengages the spring seat 325 from the head 62 thus nullifying reaction of spring 103 thereagainst, yet liquid pressure reaction plus reaction from springs 103, 144 on the reactive piston 322 and the valve element 128 respectively, and thence to the pedal 20 via the push rod 27 is effective at all times when the valve element 128 is open causing energized movement of the power member 40 in a brake-applying direction thus providing the operator with a "feel" of the extent of braking force in effect at all stages of the operating stroke of the plunger 40. This "feel" is different and improved over that provided by prior art devices for the same purpose in that a "controlled movement" of the reacting members is provided which simulates the "feel" normally inherent with pedal-operated master cylinders of conventional design. There is no tendency for the power phase to "over-brake" at any given applied position of pedal movement which provides the highly desirable feature of smooth stops at low vehicular speeds. At high vehicular speeds dangerous "grabbing" or "locking" of the wheels is prevented thus producing smooth vehicular deceleration with reduced operator effort in accordance with the pressure applied on the brake pedal.

That portion of the primary piston operably projecting into the hydraulic pressure working chamber 18 being substantially conventional in construction and operation, enables the operator to "pump" the brakes to prevent dangerous brake "fade" whether the power phase is effective or not. Thus on long downgrades the operation of the brakes may be carried out in cooperation with the power phase or independently thereof in the usual manner by "pumping" the pedal to introduce more liquid from the reservoir into the hydraulic system via the ports 83 controlled by the valve ring 82 and thence past the lip 324 of the seal 320 via the peripheral surface facilitated by the flutes 72 communicating with the valve ring 81, as needed. During brake applying movements of the primary piston 40, the pressure developed on the cup seal 320 is transmitted to the valve ring 81 to firmly seat said ring on the peripheral face of the head land 62 to thus close the ports 83 preventing escape of the liquid while under pressure back into the reservoir F.

When pressure on the pedal 20 is removed, springs 103 and 144 move the valve member 128 back to the position in which the power chamber 33 is in communication with the atmosphere. As air enters the chamber 33 via the air filter H, counterbore 134, bores 233, 234 in the free end of the push rod 27, axial bore 132, cross bores 133 and port 151, the pressure differential is reduced, and eventually dissipated, enabling springs 35 and 103 to return the primary piston 40 and coaxially disposed secondary piston 322 to their respective released positions as portrayed in Figures 1 and 2. As previously pointed out, the spring 144 acts in cooperation with spring 103 to return the slide valve element 128 to released closed position after a brake applying operation has been made.

During the return stroke, a predetermined pressure is retained in the hydraulic lines by means of the conventional residual pressure check-valve G. If the pressure in chamber 18 falls below atmospheric pressure during the return stroke, liquid is drawn through ports 83 from the reservoir F past the ring valve 82 via flutes 72 across the seal lip 324 into the chamber 18 to maintain said chamber filled. When the brakes are fully "off" or released as shown in Figures 1 and 2, the residual check-valve G influenced to seat by the spring 103 will establish the minimum residual pressure in the hydraulic lines, such as, for example 5 to 10 p.s.i. and with port 231 open excess liquid in the system returns through said port to the reservoir and vice versa if additional liquid is required to fill the system. Therefore, the port 231 may be termed a "compensating" port.

If the power phase is disabled for any reason, sufficient pressure on the pedal 20 causes the coaxial piston assembly 40, 322 and collar 160 to separate from the power assembly E whereby the master cylinder C is operated by physical force alone in the well known conventional manner, with increased operator effort being required as is understood. This novel separating feature removes the force of the return spring 35 from the pedal action, and in the case of a piston-type power assembly, friction between the leather seal and inner surface of the power cylinder offers no resistance to pedal movement, also where the power piston or diaphragm is not detachable from the primary piston 40 requiring that such power member be moved by operator force on the pedal 20, the resistance caused by working the air via the valve element 128 into and out of the power chamber 33 is also eliminated. Thus, my improved brake operating mechanism A may be operated in usual pedal fashion with no additional force required over that normally employed in operating a conventional hydraulic braking system devoid of power assistance.

My improved device A is designed primarily for use in brake-actuating installations, such as found on motor vehicles, which are operated by a suspended-type pedal or treadle, rather than the conventional brake pedal extending through the floor of the driver's compartment. Use of the pendant-type of pedal as the brake control member simplifies control of the brakes since the device A can be readily installed in the engine compartment on the firewall for accessibility and at the same time enables movement of the pedal pad 28 which the operator's foot engages in accordance with the mechanical advantage desired. That is to say, if a shortened travel is desired, connection of the push rod 27 is established closer to the pedal pad, while if a longer travel with increased mechanical advantage is desired, the connection aforesaid would be set closer to the pivot point 21 of the pedal. Where the travel of the pedal is shortened, greater reliance on the power operating phase must be made since the pedal pad is substantially in alignment with the normally released position of the adjacent accelerator pedal with consequent loss of mechanical advantage should the power phase become disabled for any reason while operating the brakes, or in applying the brakes before the engine is started to enable energization of the power cylinder B. The low-pedal pad mounting aforesaid removes some of the time lag incident to the operator transferring his foot from accelerator to brake pedal and vice versa, and therefore, under certain driving conditions safety in control of the vehicle may be enhanced. However, actual experience in driving a car equipped with my novel pressure-producing mechanism, dictates that the longer pedal travel is conducive to better power-braking control through the full vehicular speed range, and added safety is provided should the power phase fail by having the increased mechanical leverage advantage instantly available to operate the brakes in usual pedal fashion without interference from the disabled power device B. Furthermore, it is difficult to provide "feel control" in a brake operating device of the type under consideration without definite pedal movement, rather than a sensitive pedal travel which tends to cause sudden and erratic operations of the power device because the operator is deprived of a definite resisted movement of pedal control prior to the power becoming effective. It is this later serious disadvantage common in prior art devices that my improved brake operating device basically seeks to overcome by providing sufficient movement of the pedal in bringing in the power phase that sudden stops are avoided, the operator being able to blend the pedal action with the power phase to produce smooth brake applications under all driving conditions of the vehicle irrespective of the mode of pedal manipulation.

The aforesaid important advantage is provided in the present invention through the novel combination of a conventional hydraulic master cylinder associated with a new and novel power device directly controllable by an operator-operated pedal. While the prior art is replete with power-operated master cylinders of conventional or modified construction which utilize, for example, vacuum or compressed air actuation controlled by either manually or foot-operated valving remote from the master cylinder, the present invention places the pedal in novel direct mechanical relation to the parts adapted to control the action of the power device resulting in pedal control of the power phase simulating the normal "feel" when the master cylinder is operated solely by the pedal but with reduced operator effort being required.

A brief review of the operation of the conventional hydraulic master cylinder is believed apropos and is set forth below:

The master cylinder performs four essential functions, namely:

(1) Displaces liquid into the system, thus actuating the brake shoes into contact with the wheel drums.

(2) Develops the liquid pressure necessary for braking, when all shoes are in drum contact.

(3) Compensates for temperature changes or liquid seepage, thus maintaining the correct volume of liquid in the system.

(4) Charges the system with liquid upon each release of the brakes.

The reservoir F and pressure working cylinder 18 are joined by intake and by-pass ports. A passage in the reservoir filler cap vents the liquid supply to atmosphere. The intake port is connected via passages in the head land of the piston to the pressure working chamber, said passages being conventionally controlled by a star-shaped reed valve, one leg for each passage, interposed between the primary cup seal and piston head face.

With the brakes "off," the piston is fully retracted as in Figure 1, the residual pressure check-valve at the outlet or discharge port of the pressure cylinder is closed, and the by-pass port and cylinder intake port, connecting the cylinder with liquid supply, are open to enable liquid passage through the by-pass port to compensate the system for changes in liquid volume; i.e., expansion or contraction due to temperature changes or leakage.

When the brakes are "applied," the pedal is depressed to force the piston and primary cup toward the outlet end of the pressure working cylinder. Initial movement of piston and cup instantly forces liquid through the discharge port since the by-pass port was closed when the pedal was initially depressed. With the by-pass port sealed off the pressure working stroke begins. Pressure acting on the cup lip assists the cup to seal against a pressure leak past the piston. Pressure opens the residual pressure check-valve through which liquid is displaced into the hydraulic system and, after brake shoes contact with their respective wheel drums, hydraulic pressures develop in accordance with the degree of braking effect desired.

During brake "release," the pedal returns to "off" position along with the piston influenced by return spring action both in the master cylinder and wheel cylinders. Returning liquid retracts the residual check-valve as a unit from its seat, flowing around the valve to enter the pressure working cylinder. As the piston returns faster than this liquid can flow, a temporary vacuum is created in the pressure cylinder. This vacuum condition causes reserve liquid to enter the pressure cylinder through the intake port and passages in the piston head face and thence past the relaxed reed valve into the peripheral flutes on the lip portion of the seal. This additional liquid movement collapses the primary cup lip, flowing around it to help reduce the vacuum and supercharge the sealed system. As liquid continues to return from the wheel cylinders, the surplus returns to the reservoir through the open by-pass port. Where the cylinder has an open end, a secondary cup on the piston rear bearing surface prevents leaks from the reservoir.

The residual pressure check-valve has two functions, namely:

(1) To maintain 6–12 p.s.i. hydraulic pressure in the system while the brakes are released, thus lessening the possibility of atmospheric leakage.

(2) To assist "bleeding" gases from the system by preventing the entrance of air during the bleeding operation.

The present invention contemplates that the residual pressure check-valve may be located in the power unit, or conventionally at the outlet end of the pressure working chamber or in a branch thereof.

*Modified power cylinder and operation*

In the modified embodiment depicted in Figure 6, wherein parts analogous to those already described are designated by like reference characters distinguished, however, by the addition of the letter *a* to each numeral and the exponent 1 to each letter, only closely associated structure of the brake system is shown, and it may be assumed that otherwise the components correspond to those of the embodiment first disclosed (Figures 1–5).

The power cylinder $B^1$ is provided with two vacuum chambers 33a and 238, the latter chamber being sealed from the atmosphere by end wall 240 of member 43a devoid of the air holes 204.

An air-vacuum control valve 241 is provided with longitudinally spaced annular lands 129a, 242, and 130a forming annular spaces 243 and 244 therebetween. Passageway 217a is provided in the sleeve member 58a by removal of the tube 223 and which communicates continuously with the chamber 238. The land 129a being at all times disposed to the left of port 151a so that the vacuum condition within chamber 33a is constantly connected to the annular space 243 which in turn is normally connected to the port 152a with the parts in released position as shown in this view, thereby evacuating both chambers of air. The land 242 is operatively associated with the port 152a to selectively control the same for admission of air and vacuum therethrough via passageway 217a to the chamber 238. Annular passageway 244 is disposed between the land 242 and annular land 130a longitudinally spaced therefrom. A radial port 246 is provided in the valve element 241 for establishing constant communication between the annular passageway 243 and counterbore 134a.

The source of vacuum 30 is connected directly to the interior of the chamber 33a by means of a rigid tubular fitting 247 secured to the power cylinder end wall 32a and a flexible air hose 248, connected to the rigid tubular fitting 229 attached to the intake-manifold 30. A collar 249 is provided devoid of the valve function described in connection with the first embodiment to form the annular channel 165a. This collar replaces collar 160 since shoulder 161 and valve seat ring 162 are not required in this modification.

In operation, this modified structure is controlled by the already described pedal movements to slide the valve element 241 relatively to the primary tubular piston 40a, the initial movement of the valve moves the valve land 242 to a position in which the annular vacuum space 243 is isolated from the port 152a and connects the chamber 238 with the annular passageway 244 thereby admitting air into chamber 238 via counterbore 134a causing a pressure differential to be set up across opposite sides of the movable power member "$E^1$" since the chamber 33a is constantly subjected to vacuum. Accordingly, as the pressure rises in chamber 238, the power member moves leftward to actuate the tubular member 40a to displace liquid under pressure from the working chamber 18 through discharge port 14 into the hydraulic lines and thence into the hydraulic motors 16 to operate the same for the purpose intended. Otherwise, the operation of this modified mechanism is identical to that of the first disclosure, and therefore, further description is deemed unnecessary.

*Modified movable power assembly and operation*

In the modification shown in Figure 7 parts analogous to those already described are designated by like reference characters distinguished, however, by the addition of the letter "*b*" to each numeral and the exponent "2" to each letter, and the arrangement is essentially similar to that of the two previously described embodiments, except that a piston-type movable power assembly "$E^2$" is employed in lieu of the flexible-diaphragm, said assembly comprising an annular sealing member 250 of L-shaped cross section with the annular radial leg impinged between peripheral face portions of a pair of confronting clamping plates 251 and 252, and an inner disposed plate 253 having a peripheral annular flange 254 adapted to receive an annular oil wick 255 radially biased into contact with the other leg of the sealing member by an annular wave-type flat spring 256. The clamping members having central openings with their marginal portions secured as by the illustrated cap screws 257 to form a unitary assembly with a flange 258, threaded into corresponding circumferentially spaced holes in the medial portion of the latter.

In operation, this modified power assembly functions in the same manner as the flexible diaphragm previously described to actuate the primary tubular piston 40b to displace liquid under pressure from the working chamber 18 through the discharge port 14b into the wheel cylinders 16 for the purpose intended.

*Modified master cylinder piston assembly and operation*

Figures 8 and 9 show a modified form of my invention in which corresponding parts are designated by like reference characters distinguished, however, by the addition of the letter "*c*" to each numeral and the exponent "3" to each letter.

The construction of this modification differs primarily from the first embodiment (Figures 1–5) in the type of seal associated with the head land 62 of the tubular pressure-transmitting member 40 and the reactive piston 322 carried thereby.

The end face of the head land 62c is equipped with a ring-type lip seal 71c preferably composed of molded rubber having a plurality of circumferentially spaced flutes 72c in its peripheral lip surface and a central annular opening 73c. A star-shaped reed valve element 260 is employed in lieu of the ring valve 82 illustrated in Figures 1–5, to control the ports 83c, said reed valve element having an inner annular web segment 261 integral with a plurality of radially projecting legs 262, one for each of the ports 83c. This web portion has a central circular opening 263 of slightly less diameter than the opening 73c in the seal 71c to enable the marginal edge portion of the opening 263 to be impinged between the face of an external annular shoulder 264 provided on a bushing 265 pressfitted into a counterbore at 79c, and the marginal confronting face portion on the head of the primary piston land 62c. An end annular flange 266 is provided on the exterior of the bushing 265 and longitudinally spaced from the web segment 261 to provide an annular channel 267 for the reception of the marginal portion of the central opening 73c of the seal 71c. The reed valve 260 is mounted between the vertical wall of the seal 71c and face of the head land 62c in close adjacency thereto, and the opposite side of the vertical wall of the seal is stabilized against the head land by an annular flange member 268 secured in coaxial position by a split retainer ring 269 engaging an annular groove 270 provided in the periphery of the end flange 266, said flange member 268 being provided with a series of holes 271 therethrough to accommodate free flow of liquid between opopsite sides thereof.

The bushing 265 has an axial bore 85c through which a stem portion 86c slidably projects, said stem portion terminating at its forward end into a cup-shaped spring seat 87c which replaces seat 325 and normally engages the flanged end of the bushing 265. The stem 86c is provided with a longitudinal bore 88c closed at its inner end and a plurality of transverse bores 89c intersecting the longitudinal bore 88c to provide liquid communication between the pressure chamber 18c and the interior of the tubular member 40c leading from the inner end of the bushing 265. A reactive plunger or piston 108c is slidably disposed in the longitudinal 105c and comprises: an annular head land 109c having a reduced diameter integral portion terminating in an annular flange to provide an annular channel 111c for reception of the inner marginal portion of a ring-type lip seal 112c, the flanged end of channel 111c is engaged at all times by the inner end of the stem portion 86c which carries on its forward end the said spring seat 87c. An annular liquid space 113c is provided on the piston 108c between the head land 109c and the land 332c, said latter space communicating at all times via the port 114c through the wall of the tubular member 40c with the annular space 64c and reservoir F³. The annular land 332c is provided with the previously disclosed O-ring seal 117c disposed in the annular channel 118c to prevent liquid from reaching the power chamber 33 via the longitudinal bore 105c. Accordingly, the seals 71c, 109c and 117c cooperate to confine all static liquid within the reservoir F³ and the two annular spaces aforesaid.

In operation, the forward edge of the lip of the seal 71c is normally disposed to the right of the compensating port 231c to accommodate liquid compensation between the working chamber 18c and reservoir F³ in the same manner as described in connection with the first embodiment (Figures 1–5). Initial depression of the pedal 20 moves the slide valve 128c, reactive piston 108c and spring seat 87c in unison with the tubular member 40c to close the compensating port 231c in opposition to progressive increasing tension of the reactive spring 103c until pressure conditions within the working chamber 18c arrest further unison movement of the tubular member 40c; whereupon, the spring 144 yields to accommodate relative movement of the valve element 128, reactive piston 108c and spring seat 87c to place the valve land 129 in position to open port 151 (see dashed line position of land in Figure 2) thereby energizing the power member E to produce power assistance in applying the brakes in response to increasing pressure on the pedal 20 to the degree of braking effect desired.

Accordingly, initial movement of the tubular member 40c conditions the pressure working chamber 18c for operation in the same manner as described in connection with the first embodiment (Figures 1–5). All other phases of relative operations of the tubular member 40c with respect to the power member E are identical to those already described as well as the relative movement of the valve element 128, reactive piston 108c and spring seat 87c in unison with respect to the tubular member 40c, the latter relative movement being accommodated by the yielding of the thrust-transmitting spring 144 after the slack in the system has been taken up responsive to initial pedal movement. It is thus seen that the present modification differs essentially from the first embodiment (Figures 1–5) in the replacing of the dome-ended piston 322 with the stem mounted spring seat 87c and reactive piston 108c which requires modification of the vertical wall of the cup-shaped seal 320 by centrally aperturing the same for the stem portion 86c of the spring seat 87c to operably project through the bushing 265 while the latter in turn secures the star-shaped reed valve 260 in operating position on the face of the head land 62c and also provides the exterior channel 267 in which the inner marginal portion of the seal 71c is anchored in liquid-tight sealed relation on the head land aforesaid. Otherwise, the novel functional advantages are substantially similar to those provided in the embodiment depicted in Figures 1–5.

Modified movable power assembly and operation

This modification shown in Figure 10 is also designated by like reference characters previously used to identify corresponding parts distinguished, however, by the addition of the letter "e" to each numeral and the exponent "5" to each letter, and provides for the elimination of the releasable connection 169, 175 depicted in Figure 1 embodiment, by fixing the power member sleeve 290 directly to the tubular piston member 40e, as by headed pin 291 pressfitted into aligned openings 292 and 293, for movement therewith at all times. This arrangement also provides for the elimination of the collar 160 and associated elements together with the longitudinal passageway 218.

In operation, the power assembly "E⁵" moves in unison at all times with the tubular member 40e whether this member is operated by power and/or physical force, such being found commercially practicable where diaphragm-type of power assembly is employed since only the bias of the return spring 35e must be overcome, but in the case of the piston-type power assembly, added friction between piston and inner surface of the power cylinder, particularly in cold weather operation, builds up against pedal effort, and thus the novel separating feature hereinbefore fully described is used to provide lighter pedal movement where the power phase is disabled.

Modified primary piston head seal and operation

This modification is depicted in Figure 11 and the arrangement is essentially similar to the Figure 8 embodiment with corresponding parts identified by like reference characters to those previously used distinguished, however, by the addition of the letter "g" to each numeral and the exponent "7" to each letter. The construction of this modification of the invention differs primarily from the Figure 8 embodiment in the type of seal employed on the head land 62g of the tubular pressure-transmitting member 40g. The end face of the head land 62g is equipped with an annular single lip seal 71g composed of molded rubber having a plurality of circumferentially spaced flutes 72g in its peripheral lip surface and a central circular opening 73g having the marginal portion of its outer end formed as a beaded edge 74g normally under slight compression by engagement of the confronting surface of an external annular flange 76g provided on the end of a sleeve 77g projecting through said central opening, said sleeve being adapted to have either limited relative sliding movement or fixed with respect to a tubular bushing 78g pressfitted into the counterbore 79g flush with the face of the head land 62g to form the inner terminus of the tubular member 40g, the heel portion of said seal 71g is provided with a circular peripheral offset portion 81g confronting the face of the head land and adapted to control liquid flow via an annular valve ring 82g carried on said offset portion and circumferentially spaced longitudinal ports 83g through the head land, from the annular space 64g into the pressure working chamber 18g. The sleeve 77g has the aforesaid axial bore 85g through which the stem portion 86g of said integrally flanged spring seat 87g slidably projects, said seat as in Figure 8 normally engaging the flanged end of the sleeve 77g, the stem portion having the longitudinal bore 88g closed at its inner end and the plurality of transverse bores 89g intersecting the longitudinal bore 88g to provide liquid communication between the pressure working chamber 18g and the interior of the tubular member 40g leading from the inner ends of the bushing 78g and sleeve 77g. The reactive plunger or piston 108g is movably disposed in the longitudinal bore 105g and comprises the annular head land 109g having the annular channel 111g for reception of the annular pliant seal 112g, the end wall of channel 111g being engaged with the inner end of the stem portion 86g which carries the spring seat flange 87g. An annular liquid space 113g is provided on the element 108g rearwardly of the head land aforesaid, said space communicating at all times via port 114g through the wall of the member 40g connecting the annular space 64g with the interior of the longitudinal bore 105g and the reservoir F⁷. An annular pliant seal 117g is disposed in an annular channel 118g to prevent the liquid from reaching the power chamber 33g via the longitudinal bore 105g. Accordingly, the seals cooperate to confine all static liquid within the reservoir F⁷ and the two annular spaces aforesaid.

In operation, the lip edge of the cup seal 71 is normally disposed to the right of the compensating port 231g to accommodate liquid compensation between the working chamber 18g and reservoir F⁷ in the same manner as described in connection with the previous embodiments. Initial depression of the pedal 20 moves the slide valve 128g, reactive piston 108g and spring seat 87g in unison with the tubular member 40g to close the compensating port 231g in opposition to the progressive increase of tension in the reactive spring 103g until pressure conditions within the working chamber 18g arrest further unison movement of the tubular member 40g; whereupon, spring 144g yields to accommodate relatively movement of the valve element 128g, reactive piston 108g and spring seat 87g to cause the valve land 129 to open port 151 thereby energizing the power member E to produce power assistance in applying the brakes in response to increasing pressure on the pedal 20 to the degree of braking effect desired.

Accordingly, initial movement of the tubular member 40g conditions the pressure working chamber 18g for operation in the same manner as described in connection with the previous embodiments. All other phases of relative operations of the tubular member 40g with respect to the power member E are identical to those already described as well as the relative movement of the valve element 128g, reactive piston 108g and spring seat 87g in unison with respect to the tubular member 40g, the latter being accommodated by the yielding of the thrust-transmitting spring 144g after the slack in the system has been taken up responsive to initial pedal operation.

It will be noted that the structural difference between the cup 320 of the first embodiment and the cup 71g of the present modification is primarily in the construction of the vertical walls. In the former, this wall is not apertured centrally while the latter is to enable the stem 86g of the spring seat 87g to operably project through the bushing 77g which secures the inner periphery of the seal 71g in operating position with respect to the head land 62g.

Modified power cylinder assembly

This modified power cylinder construction depicted in Figure 12 is designed to facilitate assembly of the flexible power diaphragm without the necessity of having to anchor its peripheral edge within or on the cylinder casing as by a plurality of securing means such as bolts or rivets customarily used which add to production cost. This modified structure also uses like identifying reference characters to those previously applied to corresponding parts distinguished, however, by the addition of the letter "h" to each numeral and the exponent "8" to each letter. As the illustration clearly demonstrates, the power cylinder comprises two cup-shaped cylindrical casings or members 310 nad 311 of the same diameter having their open confronting ends formed with outturned annular flanges 312 and 313, respectively. The fitting 224 is mounted on the rear member 311 similarly to that already described in connection with the Figure 1 embodiment. An annular sleeve 314 is formed with an outer annular channel 315 on the inner end and an annular outturned flange 316 on the outer end. The flanges 312 and 313 on the cup-shaped members and flange 316 on the sleeve are provided with a plurality of registering holes 317 (six for example) in circumferentially equally spaced relation, the sleeve flange being adapted to be clamped between the flanges of the cup-shaped members to provide a unitary assembly.

To assemble this modified power cylinder, the peripheral bead 48h on the diaphragm 49h is inserted in the sleeve channel following which the sleeve is pressed into the position shown wherein its flange contacts the flange of the forward cup-shaped member. This operation places radial tension on the annular bead of the diaphragm to slightly deform the same to effect an air-tight seal with respect to the inner surface of the forward cup-shaped member 310 thus forming the power chamber. The other cup-shaped casing is now placed in position with its flange contacting the opposite side of the sleeve flange and the bolt holes aforesaid in registry, thereupon bolts 318 are inserted in the holes and tightened to make the power cylinder into a rigid unitary assembly as is understood. Thus, assembly or disassembly of the power cylinder may be readily effected by clamping the diaphragm sleeve between the cup-shaped members or release of the sleeve, respectively. This construction also facilitates alignment of the cylinder members with respect to each other and the hydraulic cylinder mounted on the forward end of one of the members to prevent binding of the hydraulic primary piston 40 in the assembled device A⁸.

Operational summary

From the foregoing description, taken in connection with the various illustrations of the different embodiments of my invention, it will be seen that certain interrelated components of the liquid pressure-producing mechanism A possess similar functional characteristics such that interchangeability is readily effected, particularly in connection with the power controlling features and type of pressure-transmitting member 40 employed in the master cylinder working chamber 18 which may take the form of a piston having the same cross-sectional area as the chamber, or a plunger of less cross-sectional area than the chamber which, in the latter case, would eliminate machining the interior of the chamber but a longer working stroke would be required. For example, the flexible power diaphragm 49 and the piston-type power member E² may be controlled with substantially equal efficiency by either of slide valve elements 128 or 128a, whether power cylinder B or B¹ is employed. Either of the power cylinders B or B¹ is adaptable for actuation by either compressed air or vacuum, and the pedal control of these cylinders may be had with the illustrated pendulum-type pedal 20 or other types such as those commonly on the floorboard of the driver's compartment. Spring 103 when not employed to control the residual pressure check-valve G, may be made of such strength that it alone can return the movable power assembly E to released position thus eliminating return spring 35, particularly in the case where the power member is fixed to the hydraulic piston or plunger as exemplified in Figure 10. Also the ring compensating valve 82 may be substituted for the modified star-shaped valve 260 of Figures 8 and 9.

Moreover, several novel combinations are optionally provided by the interchangeability of the different hydraulic cylinder constructions herein disclosed which may be actuated by either the illustrated flexible power diaphragm or power piston whether these power members are detachable from or rigidly secured to the primary hydraulic piston, the latter being preferably formed of a single tubular member, while any of the illustrated variations of the pedal-controlled secondary piston or plunger coaxially disposed within the hollow of the tubular member may be readily associated with either of the illustrated variations in the primary piston or plunger. Accordingly, a wide range of liquid pressure producing devices A are made available by the present invention in several different designs to suit individual installation requirements, that is, whether the unit is for operating the brakes of a pleasure car, truck or bus.

Accordingly, the aforesaid components of the present construction afford different commercially desirable results by providing selective novel combinations of braking control according to the installation desired for the particular type of motor vehicle, that is, whether a commercial or passenger car. Further beneficial results in the braking control of a motor vehicle equipped with my power brake system may be realized in the selective use of the flexible power diaphragm and piston-type power member since either of these power assemblies is adapted to not interfere with normal operator-operation of the hydraulic master cylinder in the event of complete disablement of the power or its inadequacy to provide the necessary stopping force.

It is important to point out that the relative strength of spring 144 must have a thrust-transmitting capacity in preloaded condition of greater magnitude than the combined reaction from spring 103 and the locking effect of the releasable connecting means 169—175 between the primary piston and power member shown in Figures 2 and 4, or the power assembly return spring 35 where the power member and primary piston form a unitary assembly as demonstrated in Figure 10, to enable the primary piston to be initially operated against its return spring 103 to close the compensating port 231 responsive to initial pedal movement thereof to condition the master cylinder C to pressurize the brake fluid prior to operative energization of the power cylinder B under control of the slide valve 128. For example, with the preloaded weight of spring 144 greater than the combined installed strength of spring 103 and the aforesaid locking effect of the releasable connecting means 169—175, resisted by spring 35, or in the case of the power member E being secured to the primary piston 40 for movement therewith greater than both of the return springs 35, 103, then initial pedal movement in a brake-applying direction would move the primary piston simultaneously with the secondary piston 322 and slide valve 128 to close the compensating port 231 prior to operative energization of the power member. This latter condition obtains until the reactions from spring 35 or 103 or both and pressure in the working chamber of the hydraulic master cylinder offer sufficient resistance to overcome spring 144 and thus hold the primary piston 40 from moving forwardly with the secondary piston 322 and slide valve 128, whereupon the reactive piston 322 and slide valve 128 will move relatively with respect to the tubular piston 40 to operate the slide valve 128 into "on" operating position (see dashed line position of valve land 129 in Figure 2) wherein the vacuum in the engine intake-manifold is connected with the power chamber 33 of the device A. This will cause the power member E to move forwardly and apply pressure to the tubular piston 40 in accordance with pedal movement with corresponding pressure on the liquid in the hydraulic working chamber causing the liquid to be displaced through the discharge port into the wheel cylinders to apply the brakes in a well known manner. As will be appreciated, such increase in pressure reacts on the head of the reactive piston 322, thence on the slide valve 128 to the pedal to provide the operator with a reactive force proportionate to total displacement of both pistons.

If, however, the engine is not running, the operator must actuate both pistons solely by physical force to apply the brakes, and before the working chamber 18 is conditioned to discharge liquid pressure into the hydraulic system, the compensating port 231 must be closed.

An important feature of braking control results from the use of spring 144 which commercial design indicates should be preloaded at 25–30 pounds as a thrust-transmitting means between a normal height pedal providing considerable mechanical advantage and the primary piston, such that in the event the brakes are applied initially by a sudden thrust of the pedal, this spring blocks the power-boost application until it can be brought in to assist pedal operation smoothly and without abrupt shock. This smooth mergence of the power phase with the pedal operation after the latter has inaugurated pressure build-up in the master cylinder, avoids power-boost lock of the vehicle wheels with resultant tendency of throwing the car occupants forwardly out of their seats, and sometimes leads to loss of control or a potentially dangerous skid. Thus, the present invention retains all of the functions of a standard master cylinder as well as having this important built-in automatic control to offset the usual effects of too rapid depressing of the brake pedal whereby the advantages of fully controlled, predictable response are provided for complete braking safety.

The present invention contemplates use of the so called "low-pedal" which places the foot pad of the pedal in substantially the same plane occupied by the accelerator pedal when released, thus enabling a swinging motion of the toe pivoted about the heel from one pedal to the other. This low-pedal arrangement, however, sacrifices considerable mechanical advantage over the master cylinder C making it extremely difficult to apply the brakes when vacuum-power is not available as when the engine is stopped or a vacuum line breaks. Where a low-pedal construction is employed, the suggested 25–30 pound preloaded rating of the spring 144 is not required since a spring of this weight would add to pedal load. Therefore, this spring may be reduced in weight to 10–15 pounds or even lighter according to the sensitivity of operation desired. With the lighter spring, the tubular member 40 would not be initially moved by pedal operation, but instead, due to yielding of this spring, the tubular member would be initially activated by the power member E to close the compensating port 231. This latter operation resulting from initial relative movement simultaneously of the slide valve 128 and hydraulic piston 322 with respect to the tubular member 40 to open the valve, is provided by the lighter spring 144 yielding in advance of movement of the tubular member 40 thereby as would be the case were the spring heavier.

Thus, if a more sensitive pedal feel is desired, the preloaded status of the valve spring 144 would be set to substantially counterbalance that of the master cylinder piston return spring 103 or less than this latter spring. Under such circumstances, the power phase would lead the foot-operated phase in conditioning the master cylinder C to pressurize the fluid therein since spring 103 would not yield until the power cylinder B becomes operatively energized but the resistance offered by this latter spring against the valve spring 144 would not be of sufficient magnitude as to prevent a somewhat sudden and erratic initial buildup of pressure on the brake fluid in the working chamber 18 causing the wheel brakes to suddenly apply without sufficient operator awareness of the extent of such initial application. If the pretension on the valve spring 144 is equal to or lower than that of the master cylinder spring 103, a low-pedal control is recommended to enable control of the power cylinder B with the foot as distinguished from leg thrust, with consequent smoother regulation of the initial power phase. It is, therefore, seen that when the valve spring 144 yields in advance of the yielding of the spring 103, that initial actuation of the master cylinder piston is effected by the power cylinder B to produce a more sensitized initial brake-applying operation with less operator effort involved but requiring a more capacitated booster motor B since more work is required of the latter.

Further considering the novel reactive control operations provided by varying the size of the opening 329 in the movable spring seat 325, it should be importantly observed that if the size of this opening is enlarged substantially to the same diameter as the reactive plunger 322 or even slightly larger, the reaction of the spring 103 on the head end of the plunger 322 is nullified without sacrificing the force of this spring as a return agency for the tubular pressure-transmitting member 40 to normally released position. However, the tension, due to the pliancy of the cup embossment 321, continuously reacts on the head of the piston 322 in opposition to pedal operation thereof in a brake-applying direction since the vertical wall of the spring seat is in close adjacency thereto the corresponding portion of the cup seal 320 during all working positions thereof to maintain this portion in intimate contact with the end face of the tubular member 40. As the plunger 322 and slide valve 128 are moved relatively to the tubular member 40 by pedal operation from released position to control operative energization of the power member E in the manner previously described, the cup embossment 321 is slightly elongated due to the pliancy of the material with which the cup is constructed to accommodate this relative movement with the spring 103 reacting on the spring seat to hold the cup vertical wall and lip in normal operating disposition with respect to the head of the end face land 62. This tension build up in the cup embossment which is a function of the reaction of spring 103 on the other portion of the cup to maintain the latter in sealing position, supplements the reaction of the hydraulic thrust across the head of the piston 322. If however, the opening 329 is the size illustrated or smaller, then the marginal overlap of the opening onto the similar portion of the embossment 321 acted on by the plunger 322, enables the plunger to move the spring seat relatively to the head land 62 during such energizing relative movement thereof to add the reaction of the spring 103 to said hydraulic thrust for a more sensitized reaction control and at the same time relieve the biasing effect of this spring from the tubular pressure-transmitting member 40 whereby the power member E operates free of resistance from spring 103 thus providing maximum power efficiency to apply the hydraulic thrust into the wheel cylinder of the vehicle to operate the brakes as is well understood. From the foregoing, it is clearly demonstrated that the novel adaptation of different size openings 329 in the manner above described results in beneficial advantages of reaction control to give the operator a definite and sensitized proportional "feel" of the total braking force in effect at incrementally operated positions of the pedal 20 in a brake-applying direction.

With the larger opening 329, the spring 144 alone serves to return the slide valve 128 to its released position with respect to the tubular member 40, while the smaller opening as illustrated herein enables the combined forces exerted by springs 103 and 144 to return the reactive member 322 and slide valve 128 to their respective released positions. In both cases, however, the thrust-transmitting spring 144 acts to resist relative pedal operation with respect to the tubular member 40 until the pressure buildup in the working chamber 18 has reached such magnitude as to substantially arrest further movement of the tubular member under influence of the pedal 20.

Considering the terminology used in the foregoing description and in the appended claims, the identifying expressions and/or terms employed are intended to convey meanings which include the range of reasonable equivalents in the patent sense. For example, the expressions "servomotor," "power cylinder," "power device," "power means," "power mechanism" are intended to include any casing and/or chamber having a pressure-responsive movable assembly therein, whether such assembly includes a piston, or a flexible diaphragm, or some other member serving the same purpose. The terms "front," "rear," "right," "left," and other directional words or characters are intended to have only relative connotation for convenience in describing the structure as illustrated, and are not intended to be interpreted as requiring any particular orientation with respect to associated structure external to the present disclosure.

Although it will be apparent that the preferred embodiments of the invention herein disclosed are well calculated to fulfill the objects above stated, it will be appreciated that I do not wish such to be limited to the exact construction and/or arrangement of parts shown, since it is evident that modifications, variations, changes, and substitutions may be made therein without departing from the proper scope or fair meaning of the subjoined claims.

Having thus described my invention, I claim:

1. In a power-assisted brake operating mechanism wherein there is to be operated a hydraulic master cylinder having a body member, a hydraulic fluid reservoir and working chamber in said body member, a compensating passageway normally open between said chamber and reservoir, the improvement which comprises a hydraulic fluid-displacing member in said chamber to pressurize the fluid therein, displacement of which from normal released position is opposed by a normally preloaded spring, which master cylinder is adapted to be operator-operated, and power-assisted by a pressure differential operated servomotor provided with a casing divided interiorly into a constant pressure chamber and a variable pressure chamber by a power assembly movable therein from released position to act on said hydraulic displacing member, in such manner that the initial operator force is transmitted to the hydraulic displacing member to close said compensating passageway to condition the working chamber of the master cylinder to pressurize the brake fluid thereby generating a progressively amplified resistance to such initial displacement to induce power-assist by said servomotor; control valve mechanism having at least two principal cooperating elements relatively displaceable from normal "off" position wherein said constant and variable chambers are interconnected to establish balanced pressures therein, and to operating "on" position wherein said constant and variable chambers are isolated to enable establishment of differential pressures therein to activate power-assist by said servomotor, said valve mechanism having a fluid connection with said variable pressure chamber; a source of pressure different from atmosphere communicating with said valve mechanism; another normally preloaded spring of greater strength than said first-named spring, reacting between said valve elements to separate them to normal "off" position for deactivating power-assist by said servomotor, the preloaded strength of said valve spring being capable of transmitting said initial operator force until said resistance induces modulation of the valve spring accompanied by said relative displacement of the valve elements to "on" position to activate power-assist by said servomotor in response to increased operator force; limiting means incorporated between said valve elements to define the normal "off" position thereof; reaction means effective on one of said valve elements to supplementally oppose said relative displacement of said valve elements against said valve spring; operator-operated means for operating said hydraulic displacing member and said valve mechanism including a link acting directly on said one valve element to effect relative displacement of said valve elements to "on" position; and normally spaced engageable portions operatively associated respectively with said hydraulic displacing member and one valve element for defining the relative displacement of said valve elements, said portions when engaged effecting "straight-through" operation of said hydraulic displacing member from said operator-operated link.

2. A brake operating mechanism constructed in accordance with claim 1 including automatically releasable force-transmitting means operably incorporated between said hydraulic displacing member and said power assembly to connect them for movement together during power-assist by said servomotor.

3. A brake operating mechanism constructed in accordance with claim 2 wherein said force-transmitting means comprise: a normally preloaded spring continuously reacting between a portion of said servomotor casing and said power assembly to reset the latter in normal released position; a pair of releasably engageable elements one of which is spring-loaded, to effect engagement with and accommodate disengagement from the other element and disposed respectively on said power assembly and the hydraulic displacing member, said elements being automatically disengageable to disconnect the hydraulic displacing member from said power assembly for independent two-directional movement with respect to the latter in response to operator force exerted on said link in opposition to the preloaded reaction of said power assembly resetting spring.

4. A brake operating mechanism constructed in accordance with claim 1 wherein said force-transmitting means comprise: an element interconnecting said power assembly and hydraulic displacing member in a unitary assembly for conjoint movement.

5. A brake operating mechanism constructed in accordance with claim 1 wherein said force-transmitting means comprise: an element fixed on said hydraulic displacing member, a cooperating element carried by said power assembly normally engaging said element on the hydraulic displacing member for movement together in one direction only whereby said power assembly is capable of acting on said hydraulic displacing member in a hydraulic displacing direction of movement only.

6. A brake operating mechanism constructed in accordance with claim 1 wherein said reaction means comprise: an axial bore in said hydraulic displacing member and a hydraulic reaction member slidably disposed in said bore to receive proportional hydraulic thrust from the pressurized fluid in said hydraulic working chamber, said reaction member being adapted to operatively engage said one valve element for movement together when the latter is relatively displaced with respect to the other valve element under influence of said increased operator force on said link.

7. In a power-assisted brake operating mechanism wherein there is to be operated a hydraulic master cylinder, having a body member, a hydraulic reservoir and working chamber in said body member, a compensating passageway normally open between said chamber and reservoir, the improvement which comprises: a hydraulic displacing member in the form of a longitudinal tubular wall in said chamber to pressurize the fluid therein, displacement of which from normal released position is opposed by a normally preloaded spring, which master cylinder is adapted to be operator-operated, and power-assisted by a pressure differential operated servomotor provided with a casing divided interiorly into a constant pressure chamber and a variable pressure chamber by a power assembly movable therein from released position to act on said hydraulic displacing member, in such manner that the initial operator force is transmitted to the hydraulic displacing member to close said compensating passageway to condition the working chamber of the master cylinder to pressurize the brake fluid thereby generating a progressively amplified resistance to such initial displacement to induce power-assist by said servomotor; control valve mechanism having at least two principal cooperating elements relatively displaceable from normal "off" position wherein said constant and variable chambers are interconnected to establish balanced pressures therein, and operating to "on" position wherein said constant and variable chambers are isolated to enable establishment of differential pressures therein to induce power-assist by said servomotor, one of said valve elements consisting of a portion of said tubular hydraulic displacing member, and the other valve element being a piston slidably disposed in said tubular valve portion; a port through the wall of said valve portion; a source of pressure different from atmosphere communicating with said port; an annular chamber between said valve piston and the tubular valve portion in continuous communication with said port; a second port through the wall of said valve portion interconnecting the interior thereof with said variable pressure chamber; a working land on said valve piston for selectively connecting said second port to said annular chamber and to said constant pressure chamber; a second normally preloaded spring of greater strength than said first-named spring, reacting between said valve piston and said tubular valve portion to separate them to normal "off" position for de-activating power-assist by said servomotor, the preloaded strength of said valve spring being capable of transmitting said initial operator force until said resistance induces modulation of the valve spring accompanied by said relative displacement of the valve elements to "on" position for activating power-assist by said servomotor in response to increased operator force; limiting means incorporated between said valve portion and said valve piston to define the normal "off" position thereof; reaction means effective on the valve piston to supplementally oppose relative displacement of the valve elements against said valve spring; automatically releasable force-transmitting means operably incorporated between said hydraulic displacing member and power assembly to connect them for movement together during power-assist by said servomotor; operator-operated means for operating said hydraulic displacing member and said valve mechanism including a link acting directly on said valve piston to effect relative displacement of said valve elements to "on" position; and normally spaced engageable portions operatively associated respectively with said hydraulic displacing member and the valve piston for defining the relative displacement of said valve elements, said portions when engaged effecting "straight-through" operation of said hydraulic displacing member from said operator-operated link.

8. A brake operating mechanism constructed in accordance with claim 7 wherein the releasable force-transmitting means comprise: a sleeve member co-axially fixed to the power assembly through which a portion of the hydraulic displacing member projects; a collar fixed on the hydraulic displacing member, one end of which normally engages the inner confronting end of the sleeve member; a threaded bore through the wall of the sleeve member, a threaded plug for closing one end of said bore, an element movably disposed in said bore, a third normally preloaded compression spring reacting between the plug and movable element, and a depression in the outer face of the hydraulic displacing member for reception of said movable element to releasably connect the sleeve and hydraulic displacing members for unison movement in a power-assist direction.

9. A brake operating mechanism constructed in accordance with claim 8 including a longitudinal air-vacuum passageway through the collar, an annular air-vacuum passageway intersecting the longitudinal passageway and provided in the end of the sleeve member by a counterbore closed by the confronting face of the collar in airtight sealed relation with respect to the end of the sleeve member, said annular passageway being in continuous communication with the first-named port in the hydraulic displacing member leading to said variable pressure chamber.

10. A brake operating mechanism constructed in accordance with claim 9 including a vacuum passageway closed at one end by the engaging face of the collar, with the other end intersecting the second port in the hydraulic displacing member whereby, when the collar is separated from the sleeve member by operator force, power-assist from the servomotor is inactivated, the longitudinal passageway in the sleeve member is placed in communication with the variable pressure chamber to operatively energize the power assembly despite the separated status between the collar and sleeve member, to restore normal engaging relation therebetween.

11. A brake operating mechanism constructed in accordance with claim 7 wherein said reaction means comprise: a hydraulic reaction member slidably disposed in said tubular hydraulic displacing member with one end engaging the valve piston and the other end being subjected to fluid pressure conditions in the master cylinder working chamber whereby proportional hydraulic thrust reacts simultaneously on the valve piston and operator-operated link.

12. In a brake booster mechanism including a pressure fluid operated servomotor having a casing provided with a movable wall actuated by a pressure differential on opposite sides thereof, a hydraulic master cylinder, a hydraulic fluid displacing member operable in said cylinder and connected with said wall for actuation thereby, follow-up valve mechanism having one position to establish balanced pressures on opposite sides of the wall to inactivate said servomotor and a second position to establish differential pressures on opposite sides of the wall to inactivate said servomotor, operator-operated means connected with said valve mechanism to operate the same between said two positions to control said servomotor and engageable with the hydraulic displacing member to operate the same directly and independently of said wall when the servomotor becomes inactivated, a normally preloaded spring reacting in said valve mechanism to establish the one position thereof, limiting means operatively associated with said valve mechanism to define the one position thereof, the improvement which comprises: mechanical releasable means for normally connecting said wall with said hydraulic displacing member for movement together during power-activation of said servomotor, said last-named means incorporating a spring-loaded element movable against its spring load in response to movement of the hydraulic displacing member under operator actuation, to effect disconnection between said wall and hydraulic displacing member to enable operation of the latter independently of said wall; and another normally preloaded spring of greater strength than the connecting effect of said spring-loaded element, reacting between a portion of said servomotor casing and said wall to induce said disconnection to enable resetting of the latter in inactive position upon said servomotor becoming inactivated at any activated position thereof.

References Cited in the file of this patent

UNITED STATES PATENTS

| | | |
|---|---|---|
| 1,960,996 | Guernsey | May 29, 1934 |
| 2,185,264 | Mistral | Jan. 2, 1940 |
| 2,229,247 | Kamenarovic | Jan. 21, 1941 |
| 2,241,374 | Alfieri | May 13, 1941 |
| 2,260,491 | Stelzer | Oct. 28, 1941 |
| 2,365,471 | Ingres | Dec. 19, 1944 |
| 2,395,223 | Ingres | Feb. 19, 1946 |
| 2,463,062 | Seppmann | Mar. 1, 1949 |
| 2,642,165 | Banker | June 16, 1953 |
| 2,644,305 | Price et al. | July 7, 1953 |
| 2,683,352 | Price | July 13, 1954 |
| 2,685,170 | Price | Aug. 3, 1954 |
| 2,685,171 | Price | Aug. 3, 1954 |
| 2,685,172 | Price | Aug. 3, 1954 |
| 2,690,740 | Hupp | Oct. 5, 1954 |
| 2,766,852 | Ingres | Oct. 16, 1956 |
| 2,767,548 | Ayers | Oct. 23, 1956 |
| 2,800,770 | Edge et al. | July 30, 1957 |
| 2,826,042 | Rike et al. | Mar. 11, 1958 |
| 2,852,921 | Ayers | Sept. 23, 1958 |

FOREIGN PATENTS

| | | |
|---|---|---|
| 747,273 | France | June 14, 1933 |

UNITED STATES PATENT OFFICE
CERTIFICATE OF CORRECTION

Patent No. 2,968,926                                January 24, 1961

Glenn T. Randol

It is hereby certified that error appears in the above numbered patent requiring correction and that the said Letters Patent should read as corrected below.

Column 4, line 6, for "longitudnal" read -- longitudinal --; column 5, line 60, after "in" insert -- commercial --; column 6, line 29, strike out "to"; column 9, line 8, for "are" read -- is --; column 12, line 16, for "cylinder" read -- cylinders --; column 14, lines 54 and 57, for "81", each occurrence, read -- 82 --; column 16, line 30, after "pedal" insert a comma; column 17, line 36, the italicized "a" should be enclosed in quotation marks; line 36, for "exponent 1 to" read -- exponent "1" to --; column 18, line 45, for "14b" read -- 14 --; column 19, line 15, for "opopsite" read -- opposite --; column 21, line 41, for "relatively" read -- relative --; line 63, for "the", first occurrence, read -- their --; column 22, line 8, for "nad" read -- and --; column 23, line 61, after "cylinder" insert a comma; column 25, line 38, for "the head of the end face" read -- the end face head --; column 26, line 35, after "comprises" insert a colon.

Signed and sealed this 22nd day of May 1962.

(SEAL)
Attest:
ERNEST W. SWIDER                                    DAVID L. LADD Attesting Officer                                       Commissioner of Patents